(12) United States Patent
Kida et al.

(10) Patent No.: US 8,197,896 B2
(45) Date of Patent: Jun. 12, 2012

(54) METHOD FOR PRODUCING A PRESSURE-SENSITIVE ADHESIVE TAPE OR SHEET

(75) Inventors: Takashi Kida, Osaka (JP); Jun Inui, Saitama (JP); Manabu Hashimoto, Osaka (JP); Hiroyuki Fujimoto, Saitama (JP); Shinichi Sato, Saitama (JP)

(73) Assignee: Konishi Co., Ltd. (JP)

( * ) Notice: Subject to any disclaimer, the term of this patent is extended or adjusted under 35 U.S.C. 154(b) by 0 days.

(21) Appl. No.: 13/073,415

(22) Filed: Mar. 28, 2011

(65) Prior Publication Data

US 2011/0200746 A1 Aug. 18, 2011

Related U.S. Application Data

(63) Continuation of application No. PCT/JP2009/066884, filed on Sep. 29, 2009.

(30) Foreign Application Priority Data

Sep. 30, 2008 (JP) ................................. 2008-255449

(51) Int. Cl.
*B05D 5/00* (2006.01)
(52) U.S. Cl. .................... 427/208.4; 427/207.1; 427/208
(58) Field of Classification Search ............... 427/207.1, 427/208, 208.4
See application file for complete search history.

(56) References Cited

U.S. PATENT DOCUMENTS

| 4,463,115 A | 7/1984 | Hirose et al. |
| 7,671,144 B2 | 3/2010 | Fujimoto et al. |
| 2006/0189736 A1* | 8/2006 | Mori et al. .................... 524/404 |
| 2007/0123662 A1 | 5/2007 | Ueda et al. |
| 2007/0167584 A1* | 7/2007 | Fujimoto et al. ............... 525/474 |
| 2010/0015443 A1 | 1/2010 | Yasuda et al. |

FOREIGN PATENT DOCUMENTS

| JP | 59-071377 A | 4/1984 |
| JP | 2005-054174 A | 3/2005 |
| WO | WO 2005-073333 A1 | 8/2005 |
| WO | WO 2005-073334 A1 | 8/2005 |
| WO | WO 2008-123552 A1 | 10/2008 |

OTHER PUBLICATIONS

International Search Report for International Application No. PCT/JP2009/066884, dated Jan. 12, 2010, 2 pages.

* cited by examiner

*Primary Examiner* — Michael Cleveland
*Assistant Examiner* — Xiao Zhao
(74) *Attorney, Agent, or Firm* — Brinks Hofer Gilson & Lione; G. Peter Nichols

(57) ABSTRACT

It is provided a method for producing a pressure-sensitive adhesive tape or sheet which is superior in a heat-resistance. A mixture is prepared by uniformly mixing a specific polymer having hydrolyzable silyl end groups and urethane linkages and/or urea linkages in the main chains or side chains with tackifying resins. A fluorine-containing compound selected from the group consisting of boron trifluoride, complex of boron trifluoride, fluorinating agent and alkali metal salt of fluorine-containing inorganic acid is uniformly mixed into the mixture to obtain a precursor of a pressure-sensitive adhesive agent. The adhesive precursor is applied on the surface of a tape substrate or sheet substrate. It is obtained a pressure-sensitive adhesive layer having three-dimensional reticulation structures by curing the specific polymer having hydrolyzable silyl end groups. Thereby, it is obtained the pressure-sensitive adhesive tape or sheet.

5 Claims, No Drawings

METHOD FOR PRODUCING A PRESSURE-SENSITIVE ADHESIVE TAPE OR SHEET

RELATED APPLICATIONS

This application is a continuation of PCT/JP2009/066884 filed on Sep. 29, 2009, which claims priority to Japanese Application No. 2008-255449 filed on Sep. 30, 2008. The entire contents of these applications are incorporated herein by reference.

BACKGROUND OF THE INVENTION

1. Technical Field

The present invention relates to the method for producing a pressure-sensitive adhesive tape or sheet. Especially, the invention relates to the method for producing the pressure-sensitive adhesive tape or sheet which is preferable for combining the parts of electronics.

2. Background Art

The pressure-sensitive adhesive tape or sheet is used for combining the parts of the electronics to assemble it. The pressure-sensitive adhesive tape or sheet must have a heat-resistance because of remaining in the electronics which has high temperature during use. "Heat-resistance" means that it is difficult to lower the adhesion of the pressure-sensitive adhesive tape or sheet, if many times exposing it in the high temperature. Therefore, the heat-resistant pressure-sensitive adhesive tape or sheet means that it is difficult to lower the adhesion and to release the adhered parts.

The heat-resistant pressure-sensitive adhesive tape or sheet may be obtained with using a pressure-sensitive adhesive layer composing of a heat-resistant pressure-sensitive adhesive resin. Acrylic resin is known as the heat-resistant pressure-sensitive adhesive resin.

By the way, a polymer which has hydrolysable silyl end groups is known as a pressure-sensitive adhesive resin (a patent reference 1 and 2). The polymers may be cured to be three-dimensional reticulation structures. A composition of the cured polymers and tackifying resins is used as the pressure-sensitive adhesive resin because of having a high adhesion.

Patent reference 1: WO2005/73333
Patent reference 2: JP59-71377A

However, the above composition lacks of the heat-resistance. Therefore, the purpose of the present invention is to provide the pressure-sensitive adhesive tape or sheet with the heat-resistant pressure-sensitive adhesive layer, though using a composition comprising the polymer which has the hydrolyzable silyl end groups.

SUMMARY OF THE INVENTION

The invention relates to use the specific polymer which has the hydrolyzable silyl end groups and mix the specific compound into the cured specific polymers for giving the heat-resistance to the pressure-sensitive adhesive layer. That is, the invention is a method for producing a pressure-sensitive adhesive tape or sheet composing of: preparing a precursor of a pressure-sensitive adhesive agent which is an uniform mixture of 100 parts by weight of polymer having hydrolyzable silyl end groups which are represented by the formula (1) and having urethane linkages and/or urea linkages in main chains or side chains, 10 to 150 parts by weight of tackifying resin and 0.001 to 10 parts by weight of fluorine-containing compound selected from the group consisting of boron trifluoride, complex of boron trifluoride, fluorinating agent and alkali metal salt of fluorine-containing inorganic acid; coating on the surface of a tape substrate or a sheet substrate with the precursor; and after that, forming the precursor into a pressure sensitive adhesive layer by curing the polymers.

Formula (1)

(wherein; X is a hydroxyl group or an alkoxy group, R is an alkyl group with 1 to 20 carbon atoms, n is 0, 1 or 2.)

The specific polymer used in the invention is disclosed in the Japanese patent number 3317353, 3030020 and 3343604 or the Japanese patent application kohyo publication number 2004-518801, 2004-536957 and 2005-501146. The specific polymer used in the invention is similar into having hydrolyzable silyl end groups which are represented by the formula (1) to the polymer disclosed in the patent reference 1 and 2, but differs in having urethane linkages and/or urea linkages in main chains or side chains. The polymers in the patent reference 1 and 2 are not sufficiently cured in existence of the fluorine-containing compound because the polymer has not urethane linkages and/or urea linkages in main chains or side chains. Therefore, if the polymers in the patent reference 1 and 2 are cured in existence of the fluorine-containing compound, the cured polymers is easy to flow and may not use as the pressure sensitive adhesive layer. The active hydrogens in the urethane linkages and/or urea linkages may be substituted by organic groups. Therefore, the urethane linkage includes an allophanate linkage, and the urea linkage includes a biuret linkage.

The specific polymers used in the invention are the followings.

Formula (2)

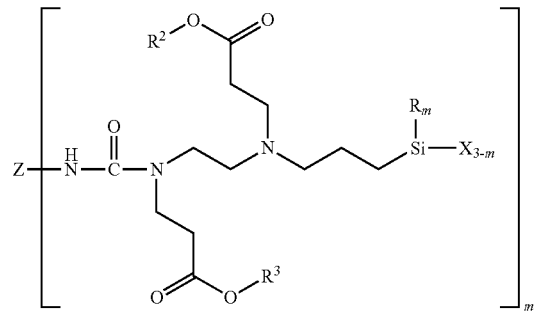

Wherein; $R^2$ or $R^3$ is an alkyl group with 1 to 20 carbon atoms, Z is a polymer residue, m is at least 2. The typical example of Z is a polyoxyalkylene ether residue. R, X and n are same in the case of the formula (1).

$R^2$, $R^3$, Z, m, R, X and n in the following formulas are same in the case of the formula (2)

Formula (3)

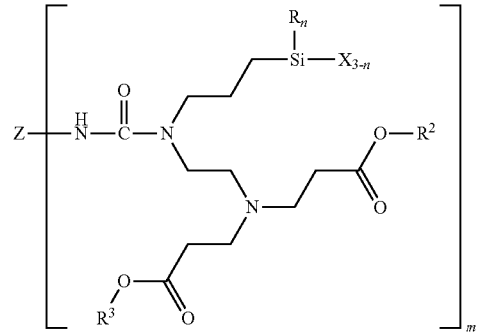

-continued

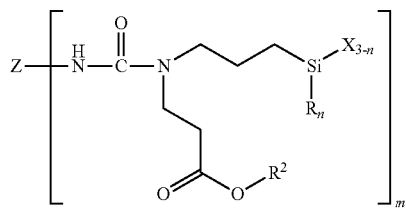

Formula (4)

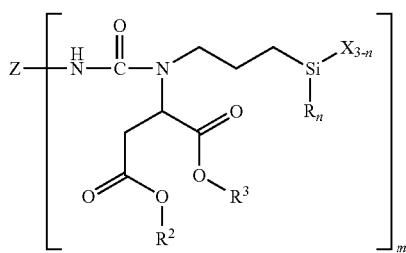

Formula (5)

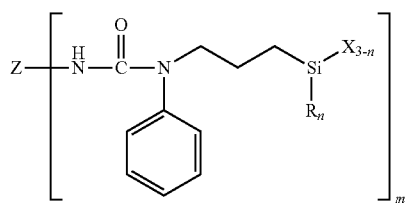

Formula (6)

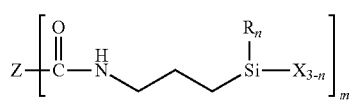

Formula (7)

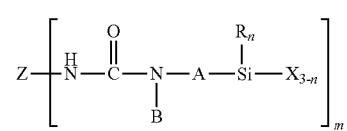

Formula (8)

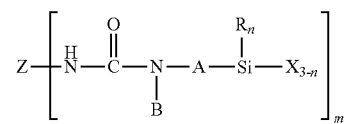

The n in the formula (1) is preferably 1. That is, the specific polymer has preferably two hydrolyzable silyl end groups. The specific polymer has three hydrolyzable silyl end groups in the case that the n in the formula (1) is 0. When the specific polymers which have three hydrolyzable silyl end groups are cured, the cured specific polymers have dense three-dimensional reticulation structures. Therefore, the pressure sensitive adhesive layer obtained by curing the specific polymers tends to be hard and be difficult to bend with the tape substrate or the sheet substrate. The specific polymer has one hydrolyzable silyl end group in the case that the n in the formula (1) is 2. When the specific polymers which have one hydrolyzable silyl end group are cured, the cured specific polymers have not sufficiently three-dimensional reticulation structures. Therefore, the pressure sensitive adhesive layer obtained by curing the specific polymers tends to be soft. To obtain the pressure sensitive adhesive layer which has desired hard or soft, it may be preferably to mix the specific polymers which have one, two and three hydrolyzable silyl end groups. The specific polymers have the urethane linkages and/or urea linkages in the main chains. The most parts of the main chain of the specific polymer preferably consist of polyoxyalkylene groups such as polyoxypropylene or polyoxyethylene groups. If the most parts of the main chain of the specific polymer consist of polyoxyalkylene groups, the pressure sensitive adhesive layer by curing the specific polymers may have a suitable softness.

It may be to mix the polymers having hydrolyzable silyl end groups into the specific polymers in the invention. For example, it may be mix the polymers disclosed in the patent reference 1 or 2 into the specific polymers. It may be to mix the polymers which select 0 as m in the formulas 2 to 8 into the specific polymers. The polymers which select 0 as m in the formulas 2 to 8 is difficult to be cured in existence of the fluorine-containing compound. However, if mixing the polymers into the specific polymers, the polymers tend to be cured.

Rosin-based resin such as rosin, polymerized rosin, hydrogenated rosin or rosin ester; terpene-based resin such as terpene phenol resin, aromatic-modified terpene resin, hydrogenated terpene resin or rosin-modified phenol resin; aliphatic-based petroleum resin; aromatic-based petroleum resin; hydrogenated petroleum resin such as hydrogenated aromatic-based petroleum resin, hydrogenated dicy-clopentadiene-based petroleum resin or hydrogenated aliphatic-based petroleum resin; coumarone-indene resin; polystyrene-based resin; poly(maleic acid)-based resin; alkylphenol resin; or xylene resin may be used as the tackifying resin in the invention. Especially, it is preferable to use terpene-based resin such as terpene phenol resin as the tackifying resin in the invention.

The boron trifluoride, complex of boron trifluoride, fluorinating agent and/or alkali metal salt of fluorine-containing inorganic acid are used as the fluorine-containing compound. When mixing the fluorine-containing compound into the precursor including the specific polymer, the pressure sensitive adhesive layer having the three-dimensional reticulation structures is promptly formed by catalysis of the fluorine-containing compound. Moreover, it may give heat-resistance to the layer. The fluorine-containing compound is left as it is or as it is modified in the layer.

It may be the following reason that the layer has heat-resistance by using the fluorine-containing compound. Tin or titanium compound is well known as a catalyst for curing the polymer which has hydrolyzable silyl end groups. If using the tin or titanium compound in the invention, the specific polymer hydrolyzes in the points of the urethane linkages and/or urea linkages by the leaving tin or titanium compound in the layer. On the other hand, the specific polymer does not hydrolyze by the leaving fluorine-containing compound in the layer. That is, the layer has heat-resistance because it may be difficult the specific polymer to hydrolyze. Using a well known amine compound as the catalyst, it may be difficult the specific polymer to hydrolyze. However, it may be difficult to form the layer because the catalysis of the amine compound is insufficient.

The boron trifluoride is gas at normal temperature, and then it is used in the invention though it is handled with care. The complex of boron trifluoride is preferably used in the invention because it is handled without care. Amine complex, alcohol complex, ether complex, thiol complex, sulfide complex or carboxylic acid complex is used as the complex of boron trifluoride in the invention. Especially, amine complex of boron trifluoride is preferable because it is superior in stability and catalysis.

As amino compounds to obtain amine complexes of boron trifluoride are used ammonia, monoethylamine, triethylamine, piperidine, aniline, morpholine, cyclohexylamine, n-buthylamine, monoethanolamine, diethanolamine, triethanolamine, guanidine, 2,2,6,6-tetramethylpiperidine, 1,2,2,6,6-pentamethylpiperidine, N-methyl-3,3'-iminobis(propylamine), ethylenediamine, diethylenetriamine, triethylenediamine, pentaethylenediamine, 1,2-diaminopropane, 1,3-diaminopropane, 1,2-diaminobutane, 1,4-diaminobutane, 1,9-diaminononane, ATU(3,9-bis(3-aminopropyl)-2,4,8,10-tetraoxaspiro[5.5]undecane), CTU guanamine, dodecanedioyl dihydrazide, hexamethylenediamine, m-xylylenediamine, dianisidine, 4,4'-diamono-3,3'-diethyldiphenylmethane, diaminodiphenyleter, 3,3'-dimethyl-4,4'-diaminodiphenylmethane, tolidine base, m-toluoylenediamine, o-phenylenediamine, m-phenylenediamine, p-phenylenediamine, melamine, 1,3-phenylguanidine, di-o-tolylguanidine, 1,1,3,3-tetramethylguanidine, bis(aminopropyl)piperazine, N-(3-aminopropyl)-1,3-propanediamine, bis(3-aminopropyl)ether, compounds having primary amino groups such as 'Jeffamine®' manufactured by Sun Techno Chemicals Co. Ltd., compounds having secondary amino groups such as piperazine, methylaminopropylamine, ethylaminopropylamine, ethylaminoethylamine, laurylaminopropylamine, 2-hydroxyethylaminopropylamine, 1-(2-aminoethyl)piperazine, N-aminopropylpiperazine, 3-aminopyrrolidine, 1-o-tolylbiguanide, 2-aminomethylpiperazine, N-aminopropylaniline, 2-hydroxyethylaminopropylamine, laurylaminopropylamine, 2-aminomethylpiperizine, 4-aminomethylpiperizine, compound represented by the formula $H_2N(C_2H_4NH)nH(n\approx5)$ ('Poly-8®' manufactured by Tosoh Corporation), heterocyclic tertiary amine compound such as N-alkylmorpholine, compounds having silyl group and amino group such as γ-aminopropyltriethoxysilane. As the compounds having secondary amino groups are used cis-2,6-dimethylpiperazine, cis-2,5-dimethylpiperazine, 2-methylpiperazine, N,N'-di-t-butylethylenediamine, 2-aminomethylpiperidine, 4-aminomethylpiperidine, 1,3-di-(4-piperidyl)-propane, 4-aminopropylaniline, homopiperazine, N,N'-diphenylthiourea, N,N'-diethylthiourea or N-methyl-1,3-propanediamine. As the compounds having silyl group and amino group are used 1,8-diazabicyclo[5.4.0]undecyne-7,6-dibutylamino-1,8-diazabicyclo[5.4.0]undecyne-7, 1,5-diazabicyclo[4.3.0]nonene-5, 1,4-diazabicyclo[2.2.2]octane, pyridine, N-alkylpiperizine, 1,5,7-triazabicyclo[4.4.0]deca-5-ene or 7-methyl-1,5,7-triazabicyclo[4.4.0]deca-5-ene. As the compounds having silyl group and amino group are used γ-aminopropylmethylethoxysilane, 4-amino-3-dimethylbutyltriethoxysilane, N-β(aminoethyl)-γ-aminopropyltriethoxysilane, N-β(aminoethyl)-γ-aminopropylmethyldiethoxysilane, N-3-[amino(dipropyleneoxy)]aminopropyltoriethoxysilane, (aminoethylaminomethyl)phenethyltriethoxysilane, N-(6-aminohexyl)aminopropyltoriethoxysilane, N-phenyl-γ-aminopropyltoriethoxysilane or N-(2-aminoethyl)-11-aminoundecyltyiethoxysilane. Furthermore, the amine complexes of boron trifluoride sold on the market may be used in the invention. As the amine complexes of boron trifluoride sold on the market are used Anchor-1040, Anchor-1115, Anchor-1170, Anchor-1222, BAK1171 manufactured by Air Products Japan, Inc.

The fluorinating agent may be a nucleophilic fluorinating agent having a fluoric anion as an active species, or an electrophilic fluorinating agent having an electron deficient fluoric atom as an active species. As the nucleophilic fluorinating agents are used 1,1,2,3,3,3-hexafluoro-1-dialkylaminopropanes such as 1,1,2,3,3,3-hexafluoro-1-diethylaminopropane, trialkylaminetrishydrofluorides such as triethylaminetrishydrofluoride or dialkylaminosulfurtrifluorides such as diethylaminosulfurtrifluoride. As the electrophilic fluorinating agents are used N-fluoropyridinium salts such as N,N'-difluoro-2,2'-bipyridinium bistetrafluoro-borate or N-fluoropyridinium trifluoromethanesulfonate; 4-fluoro-1,4-diazoniabicyclo[2.2.2]octane based compounds such as 4-fluoro-1,4-diazoniabicyclo[2.2.2]octane-bistetrafluoroborate; or N-fluorobis(sulfonyl)amine based compounds such as N-fluorobis(phenylsulfonyl)amine. The 1,1,2,3,3,3-hexafluoro-1-diethylaminopropane is preferable because it is liquid and easy to get.

As the alkali metal salts of fluorine-containing inorganic acids are used sodium hexafluoroantimonate, potassium hexafluoroantimonate, sodium hexafluoroarsenate, potassium hexafluoroarsenate, lithium hexafluorophosphate, sodium hexafluorophosphate, potassium hexafluorophosphate, sodium pentafluorohydroxoantimonate, potassium pentafluorohydroxoantimonate, lithium tetrafluoroborate, sodium tetrafluoroborate, potassium tetrafluoroborate, sodium tetrakis(trifluoro-methylphenyl)borate, sodium trifluoro(pentafluorophenyl)borate, potassium trifluoro(pentafluorophenyl)borate, sodium difluorobis(pentafluorophenyl)borate, potassium difluorobis(pentafluorophenyl)borate. As the fluorine-containing inorganic acids are preferably used tetrafluoroboric acid or hexafluorophosphoric acid. As the alkali metals is preferably used lithium, sodium or potassium.

The precursor of the pressure-sensitive adhesive agent is obtained by uniformly mixing the specific polymer, the tackifying resin and the fluorine-containing compound. The precursor is preferably obtained by uniformly mixing the fluorine-containing compound into the uniform mixture of the specific polymer and the tackifying resin. That is, the precursor is preferably obtained by last mixing the fluorine-containing compound. An organic solvent may be used to control a viscosity of the uniform mixture when mixing the specific polymer and the tackifying resin. As the organic solvents is used ethyl acetate, toluene, methylcyclohexane or alcohol such as ethanol. The organic solvent may be not used when it is superior in the compatibility of the specific polymer and the tackifying resin.

It is mixing 10 to 150 parts by weight of the tackifying resin per 100 parts by weight of the specific polymer. If it is less 10 parts by weight of the tackifying resin, the pressure sensitive adhesive layer has not high adhesion. If it is more 150 parts by weight of the tackifying resin, the pressure sensitive adhesive layer has hardness and has not high adhesion. It is mixing 0.001 to 10 parts by weight of fluorine-containing compound per 100 parts by weight of the specific polymer. If it is less 0.001 parts by weight of fluorine-containing compound, the pressure sensitive adhesive layer has not the heat-resistance. Moreover, it is difficult to obtain the pressure sensitive adhesive layer having the three-dimensional reticulation structures by the insufficient catalysis. If it is more 10 parts by weight of fluorine-containing compound, the precursor may be cured by the excess catalysis.

The precursor of the pressure-sensitive adhesive agent may include the following compounds or materials. For example, it may be silane coupling agents, antioxidants, fillers, plasticizers, Thixotropic agents such as amidowax, dehydrating agents such as calcium hydroxide, diluents such as isoparaffin, aluminum hydroxide, flame retardants including halogen compounds, flame retardants including phosphorus compounds, flame retardants including silicon compounds, oligomers such as acrylic oligomers, pigment, ethyl silicates or oligomers thereof, propyl silicates or oligomers thereof, butyl silicates or oligomers thereof, titanate coupling agents, aluminum coupling agents or drying oils.

As the silane coupling agents are used 3-aminopropyltrimethoxysilane, 3-aminopropyltriethoxysilane, 3-aminopropylmethyldimethoxysilane, 3-amino-propylmethyldiethoxysilane, (aminomethyl)trimethoxysilane, (aminomethyl)methyldimethoxysilane, (aminomethyl)triethoxysilane, (aminomethyl)methyldiethoxysilane, 2-aminoethyltrimethoxysilane, 2-aminoethylmethyldimethoxysilane, 2-aminoethyltriethoxysilane, 2-aminoethylmethyldiethoxysilane, 4-amino-3,3-dimethylbutyltrimethoxysilane, 4-amino-3,3-dimethylbutylmethyl-dimethoxysilane, 4-amino-3,3-dimethylbutyltriethoxysilane or 4-amino-3,3-dimethylbutylmethyldiethoxysilane.

As the antioxidants are used inhibitors to prevent stating radical chain reactions (such as hydrazide compounds or amide compounds), ultraviolet absorbers (such as benzotriazole compounds, triazine compounds or benzophenone), quenchers (such as organonickel compounds), radical scavengers such as Hindered Amine Light Stabilizers, antioxidants (such as hindered phenol compounds or semihindered phenol compounds), peroxide decomposers such as antioxidants including phosphorus compounds (such as phosphite compounds or phoshonite compounds), antioxidants including sulfurous compounds such as thioether compounds. As the antioxidants sold on the market are used Adkstab® series manufactured by Adeka corporation; Hostanox® series, Hostavin® series, Sanduvor® series, Hostastat® series manufactured by Clariant (Japan) K.K.; Sanol® series manufactured by Snkyo lifetech corporation, Tinuvin® series, Irgafos® series, Irganox® series, Chimassorb® series manufactured by Ciba Specialty Chemicals Inc.

As the fillers are used calcium carbonates, surface-treated calcium carbonates, magnesium carbonates, organic polymers, claies, talcs, silicas, fumed silicas, glass balloons, plastic balloons, aluminum hydroxides, magnesium hydroxides.

As the plasticizers are used phthalate esters such as dioctyl phthalate (DOP), dibutyl phtalate (DBP), di-isononyl phtalate (DINP), di-isodecyl phtalate (DIDP) or butylbenzyl phtalate (BBP); aliphatic dibasic esters such as dioctyl adipate, dioctyl sebacate, dibutyl sebacate or isodecyl succinate; fatty acid esters such as butyl oleate or acetylricinoleic acid methyl ester; polyalkyleneglycol esters such as diethyleneglycol dibenzoate, triethyleneglycol dibenzoate or pentaerythritol esters; phosphates such as tricresyl phosphate or tributyl phosphate; trimellitates; polystyrene or poly-α-methylstyrene; hydrocarbon polymers such as polybutadiene, polybutene, polyisobutylene, poly-(butadieneacrylonitrile) or polychloroprene; hydrocarbon oils such as chlorinated paraffin, alkyldiphenyl or partially hydrogenated terphenyl; process oils; polyetherpolyol such as polyethyleneglycol, polypropyleneglycol or polytetramethyleneglycol; polyethers substituting ester or ether groups for the hydroxyl group of the polyetherpolyol; epoxidized plasticizers such as epoxidized soybean oil or epoxidized benzyl stearate; polyester plasticizers which are obtained by esterifying dibasic acids such as sebacic acid, adipic acid, azelaic acid or phthalic acid and dihydric alcohol such as ethyleneglycol, diethyleneglycol, triethyleneglycol, propyleneglycol or dipropyleneglycol; or vinyl polymers which are obtained by polymerizing vinyl monomers such as acrylic monomers. It is preferable to use the phthalate esters; the polyetherpolyol such as polyethyleneglycol, polypropyleneglycol or polytetramethyleneglycol; or the polyethers substituting ester or ether groups for the hydroxyl group of the polyetherpolyol.

After the precursor of a pressure-sensitive adhesive agent is obtained, the precursor is applied on the surface of the tape substrate or the sheet substrate. As the tape substrate or the sheet substrate are used metal foils such as aluminum foil, plastic films such as polyester film, foams, nonwovn-fabrics. It is preferable to use the aluminum foil or the polyester film because of the heat-resistance. The precursor may be applied on the other surface or both surface of the tape substrate or the sheet substrate. When the precursor is applied on the both surface, it is obtained a pressure sensitive adhesive double coated tape or sheet. As a method of applying the precursor may be used a method with knife coater or roll coater. The precursor may be applied in a thickness between 5 and 200 μm.

After the precursor is applied on the surface of the tape substrate or the sheet substrate, the specific polymers in the precursor are cured in existence of moisture. That is, the applied precursor may be kept in the atmosphere, because the specific polymers are condensed and cured to be three-dimensional reticulation structures in the moisture of the atmosphere. If the precursor includes the organic solvent, the applied precursor may be heated at 80° C. or more because of vaporizing it. Therefore, the applied precursor is generally heated in the atmosphere to be formed into the pressure sensitive adhesive layer, and the pressure-sensitive adhesive tape or sheet is obtained.

The pressure-sensitive adhesive tape or sheet is used in the various ways as usual. Especially, it is preferable for combining the parts of the electronics because of the superior heat-resistance.

The pressure sensitive adhesive layer on the adhesive tape or sheet obtained by the invention consists of the three-dimensional reticulation structures obtained by curing the specific polymers, and the tackifying resin and the fluorine-containing compound into the matrix of the three-dimensional reticulation structures. The pressure sensitive adhesive layer is superior in the heat-resistance because of having the fluorine-containing compound in it. Therefore, if the adhesive tape or sheet is used and many times exposed in the high temperature, it is difficult to lower the adhesion of the adhesive tape or sheet.

EXAMPLES

The invention is described on the basis of the following examples. However, the invention is not limited to the examples. The invention shall be determined on the basis of the discovery which is able to obtain the heat-resistance pressure-sensitive adhesive layer by curing the precursor.

Example 1

[Synthesis of the Specific Polymer]

It was carried out under an atmosphere of nitrogen in a reactor vessel to mix 206 parts by weight of N-aminoethyl-γ-aminopropylmethyldimethoxysilane with 172 parts by weight of methyl acrylate. After that, there had reacted for ten hours at 80° C. to get sililating agent of silane compound.

On the other hand, it was carried out an atmosphere of nitrogen in another reactor vessel to mix 1000 parts by weight of PML S4015 (polyoxypropyrenediol, Mw=15000: manufactured by Asahi Glass Co., Ltd.) with 24.6 parts by weight of isophoronediisocyanate (NCO/OH=1.7) and 0.05 parts by weight of dibutyltin dilaurate. After that, there had reacted for seven hours at 85° C. to get a urethane prepolymer having urethane linkages in the main chain most parts of which consisted of polyoxypropylene.

It was carried out under an atmosphere of nitrogen in another vessel to mix 1000 parts by weight of the urethane prepolymer with 42.1 parts by weight of the above sililating agent of silane compound. After that, there had reacted for one hours at 80° C. to get a specific polymer. The progress of the reaction was confirmed with disappearing of IR absorption (2265 cm$^{-1}$) which results from isocyanate group.

The specific polymer had two methoxy groups as the hydrolyzable silyl end groups in the formula (1), and had polyoxypropylene as most parts of the main chain, and had the urethane linkages in the main chain.

[Producing a Pressure-Sensitive Adhesive Sheet]

A mixture was prepared by uniformly mixing 100 parts by weight of the above specific polymer with 100 parts by weight of ethyl acetate as a solvent and 100 parts by weight of terpene phenol resin(YSpolyster® T-130) as a tackifying resin.

A precursor of a pressure-sensitive adhesive agent was prepared by uniformly mixing 300 parts by weight of the above mixture with 1.3 parts by weight of methanol which included 15 weights % of boron trifluoride and made a methanol complex of boron trifluoride.

The precursor was applied on one surface of a polyester film having 25 μm in thickness with knife coater to be 60 μm in thickness. After that, it was carried out to heat for ten minutes at 120° C. under the atmosphere, so that a pressure sensitive adhesive layer was obtained by curing the specific polymer and vaporing the ethyl acetate in the applied precursor. Thereby, a pressure-sensitive adhesive sheet was obtained which consisted of laminated the pressure sensitive adhesive layer on the one surface of the polyester film.

Example 2

A solution was prepared by dissolving 1 part by weight of monoethyl-amine complex of boron trifluoride which included 59 weights % of boron trifluoride into 9 parts by weight of 3-aminopropyltrimethoxysilane (Trade name was KBM903 manufactured by Shinetsu Chemical Co., Ltd.). A pressure-sensitive adhesive sheet was obtained with the same method of the Example 1 except that 3.3 parts by weight of the solution were used in place of 1.3 parts by weight of the methanol.

Comparative Example 1

As a titanium compound was prepared diisopropoxybis (acetylacetonate) titanium which was a catalyst to cure the polymer having hydrolyzable silyl end groups, and was sold as Orgatics® TC-100 by Matsumoto Trading Co., Ltd. A pressure-sensitive adhesive sheet was obtained with the same method of the Example 1 except that 1.3 parts by weight of the diisopropoxybis(acetylacetonate) titanium were used in place of 1.3 parts by weight of the methanol.

Comparative Example 2

As a titanium compound was prepared tetraacetylacetonate titanium which was a catalyst to cure the polymer having hydrolyzable silyl end groups, and was sold as Orgatics® TC-401 by Matsumoto Trading Co., Ltd. A pressure-sensitive adhesive sheet was obtained with the same method of the Example 1 except that 1.3 parts by weight of the tetraacetylacetonate titanium were used in place of 1.3 parts by weight of the methanol.

Comparative Example 3

As a titanium compound was prepared diisopropoxybis (ethylacetoacetate) titanium which was a catalyst to cure the polymer having hydrolyzable silyl end groups, and was sold as Orgatics® TC-750 by Matsumoto Trading Co., Ltd. A pressure-sensitive adhesive sheet was obtained with the same method of the Example 1 except that 1.3 parts by weight of the diisopropoxybis(ethylacetoacetate) titanium were used in place of 1.3 parts by weight of the methanol.

It was measured with the following method, the adhesions of the pressure-sensitive adhesive sheets obtained by the Example 1, 2 and the Comparative Example 1~3. The first, as an adherend was prepared a stainless steel plate which was 30 mm in width and 150 mm in length and the surface of which was polished with a sandpaper of No. 360. On the other hand, it was picked up each specimen which was 25 mm in width and 150 mm in length from the above adhesive sheets. The each specimen was applied to the adherend to be each laminate. After keeping the each laminate for seven days under an atmosphere of 23° C., it was measured the Adhesion A between the specimen and the adherend. After keeping the each laminate for thirty days under an atmosphere of 80° C., and after furthermore keeping the each laminate for one day under an atmosphere of 23° C., it was measured the Adhesion B between the specimen and the adherend. The Adhesion A and B were measured on the basis of JIS Z 0237 at 23° C. and 65% RH. A dimension of the Adhesion A and B was N/25 mm. Moreover, it was observed the point of peeling when measuring the Adhesion A and B. It was written 'IP' meaning 'interfacial peeling' in the Table 1 when observing the peeling of the interface between the specimen and the adherend, while 'CO' meaning 'cohesive failure' when observing the peeling in the adhesive layer of the specimen. These result were showed in the Table 1.

TABLE 1

|  | Example | | Comparative Example | | |
|---|---|---|---|---|---|
|  | 1 | 2 | 1 | 2 | 3 |
| Adhesion A | 38.7 | 34.3 | 37.2 | 41.2 | 36.8 |
|  | (IP) | (IP) | (IP) | (IP) | (IP) |
| Adhesion B | 49.0 | 50.0 | 19.6 | 19.6 | 21.6 |
|  | (IP) | (IP) | (CO) | (CO) | (CO) |

It was obvious in the Table 1 that the adhesive sheets of the Example 1 and 2 were superior in the Adhesion B to the adhesive sheet of the Comparative Example 1, 2 and 3. Therefore, the adhesive sheet of the Example 1 and 2 were superior in the heat-resistance because it was difficult to lower the adhesion under high temperature.

What is claimed is:

1. A method for producing a pressure-sensitive adhesive tape or sheet comprising:
    preparing a precursor of a pressure-sensitive adhesive agent which is an uniform mixture of
        100 parts by weight of a polymer selected from the group consisting of the polymer represented by the formula (2) and the polymer represented by the formula (3),

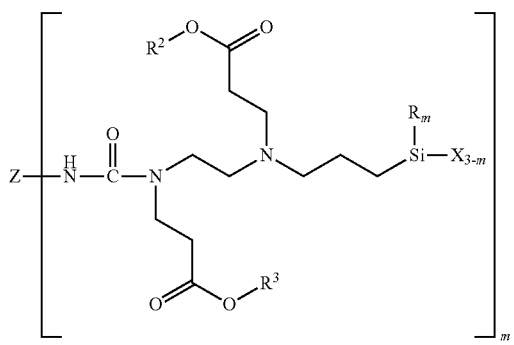

Formula (2)

wherein Z is a polyoxyalkylene ether residue, R, R², or R³ is an alkyl group with 1 to 20 carbon atoms, X is a hydroxyl group or an alkoxy group, n =0, 1, or 2, and m is at least 2

Formula (3)

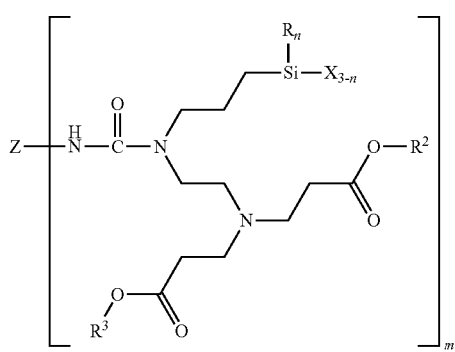

wherein Z is a polyoxyalkylene ether residue, R, R², or R³ is an alkyl croup with 1 to 20 carbon atoms, X is a hydroxyl group or an alkoxy group, n =0, 1, or 2, and m is at least 2, 10 to 150 parts by weight of tackifying resin and 0.001 to 10 parts by weight of a fluorine-containing compound selected from the group consisting of boron trifluoride, complex of boron trifluoride, fluorinating agent and alkali metal salt of fluorine-containing inorganic acid;

coating on the surface of a tape substrate or a sheet substrate with the precursor; and after that, forming the precursor into a pressure sensitive adhesive layer by curing the polymers.

2. The method for producing the pressure-sensitive adhesive tape or sheet according to claim 1 wherein preparing the precursor of a pressure-sensitive adhesive agent is by mixing the fluorine-containing compound into a uniform mixture of the polymer and the tackifying resin.

3. The method for producing the pressure-sensitive adhesive tape or sheet according to claim 1 wherein n of the formula (2) or (3) is 1.

4. The method for producing the pressure-sensitive adhesive tape or sheet according to claim 1 wherein the tackifying resin is terpene-based resin.

5. The method for producing the pressure-sensitive adhesive tape or sheet according to claim 1 wherein the fluorine-containing compound is methanol complex of boron trifluoride or monoethylamine complex of boron trifluoride.

* * * * *